Sept. 14, 1926.
M. LOUGHEAD
1,599,905
METHOD OF MAKING HIGH PRESSURE HOSE
Filed July 10, 1925
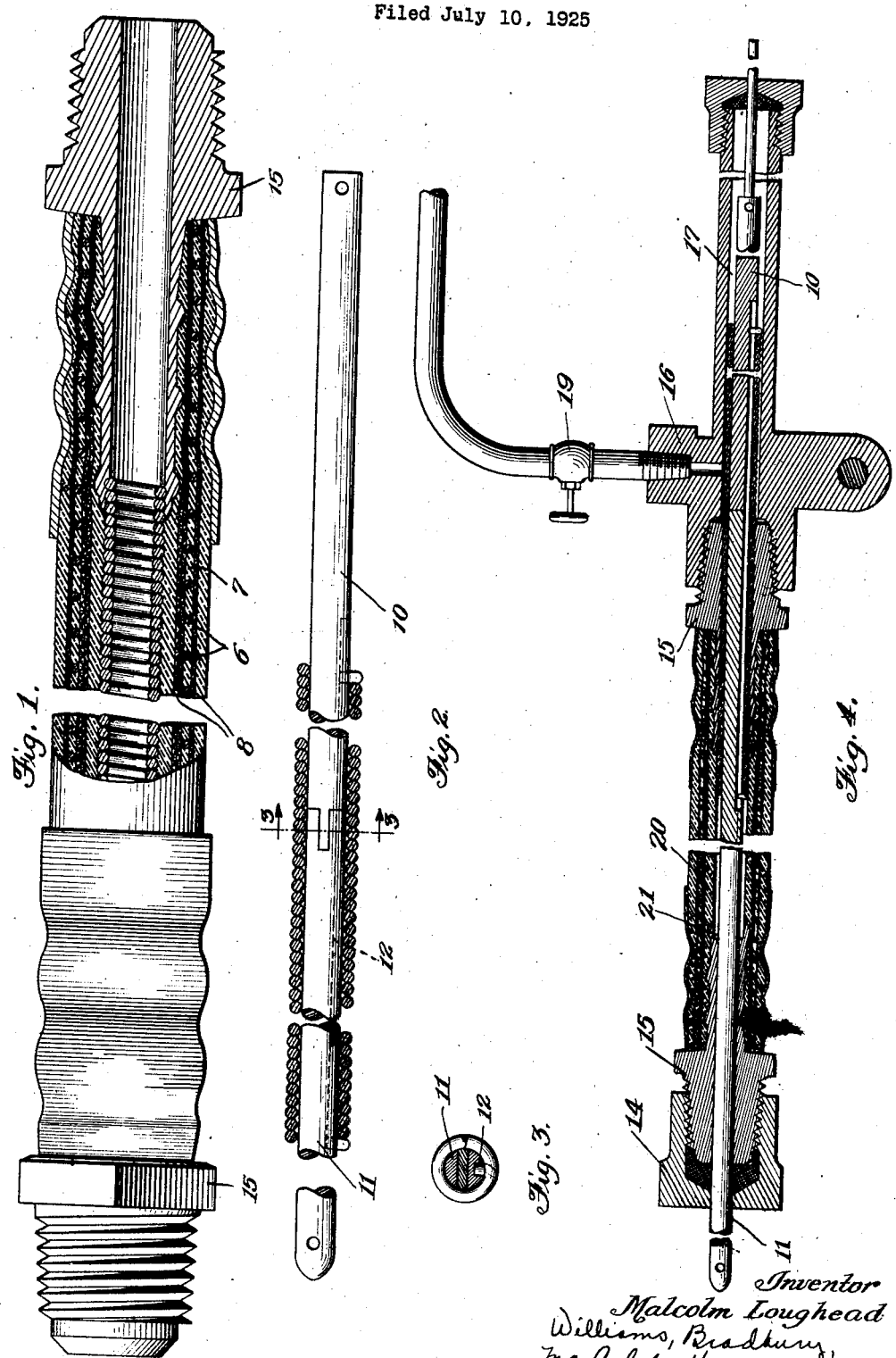

Patented Sept. 14, 1926.

1,599,905

UNITED STATES PATENT OFFICE.

MALCOLM LOUGHEAD, OF DETROIT, MICHIGAN, ASSIGNOR TO HYDRAULIC BRAKE COMPANY, OF LOS ANGELES, CALIFORNIA, A CORPORATION OF CALIFORNIA.

METHOD OF MAKING HIGH-PRESSURE HOSE.

Application filed July 10, 1925. Serial No. 42,850.

This invention relates to a high pressure hose and the method of making the same. It is important that high pressure hose used for conveying non-compressible liquid from a power cylinder to work cylinders in an automobile braking system shall be substantially non-expansive under the pressures encountered in the operation of the vehicle brakes. The hose heretofore commonly used in practice for this purpose is provided with an internal metallic lining made of a coil of wire, which coil is inserted in the hose by applying a pressure to the hose much higher than that expected to be encountered in the operation of the brakes, then inserting the coil and permitting the hose to contract around the coil of wire when the pressure is relieved. Such a hose is satisfactory so long as the brake pressure remains below that at which the hose may be expanded away from the outside of the coil of wire. The reason that such a hose is non-expansive under ordinary conditions is that the rubber of the hose is normally under stress against the outside of the coil of wire and does not change its position to leave the coil and thus enlarge the passage through the hose until the pressure has exceeded that represented by the natural compression of the rubber against the wire spring.

The object of my present invention is to provide a hose which shall be substantially non-expanding throughout a wider range than that above described and which has been heretofore used for braking purposes. In accordance with my present invention, I utilize a hose which is provided with a coiled wire insert which lies embedded within the hose, preferably between two layers of fabric therein, this wire restricting the expansion of the hose under high pressure to a much greater degree than if the hose were constructed of rubber and fabric without the embedded coil of wire. Within the passage through this hose I place a coil of spring wire which, by the process hereinafter described, is caused to contact with extremely high pressure against the inner walls of the hose, thus squeezing or compressing a portion of the rubber and fabric hose between the two coils of wire, that embedded in the hose and that lining the inner opening through the hose.

My invention comprises the hose, as above described, and the process by which the hose is constructed, and is illustrated in the accompanying drawing, in which—

Figure 1 represents a link or length of hose having coupling members attached to each end thereof, a portion of the hose and one coupling member being shown in section;

Fig. 2 illustrates the tool used in inserting the inner coil of wire within the hose;

Fig. 3 is a section through the hose inserting member taken on the line 3—3 of Fig. 2, and Fig. 4 illustrates the machine for use in inserting the tool and coil of Fig. 2 within the hose.

My invention can be best understood by following out the process by which the hose is constructed. The length of hose provided with a coil of reinforcing wire 6 embedded in rubber 7 between the layers of fabric 8 is first attached to two coupling members, the openings through the end of the coupling members being substantially the same size as the normal opening through the hose. A coil of spring wire of sufficient length to extend throughout the length of the hose and into the coupling members at each end thereof is placed upon a two-part mandrel, each end of the spring wire coil being turned inwardly, the mandrel being provided with a longitudinal slot or keyway for receiving the turned-in ends of said wire. This mandrel, as shown in Fig. 2, is composed of two parts 10 and 11, the mating ends of which are provided with registering slot and driver to prevent undesired relative rotation of the two parts. The keyway 12 extends into each of the registering parts 10 and 11 for a total distance substantially equal to the length of the coil spring to be inserted in the hose. After the parts 10 and 11 have been inserted into the coil spring from the opposite ends thereof, they are relatively rotated while the driver and slot connection is held out of registry until the spring has been tightly wound about the mandrel. Thereupon the parts 10 and 11 are pushed together to a position in which the driver and slot register to prevent the unfurling of the spring. The elongated end of the mandrel 11 extends permanently through a packing gland 14 (see Fig. 4) and is of sufficient length so that when the gland 14 is threaded upon the coupling member 15 (Fig. 4), the portion of the mandrel 11, having the slot or keyway therein, extends entirely through and beyond the coupling member attached to the other end of the section of hose into which the spring is to be inserted. A fixture 16 having an opening 17 therein of greater length than the full length of the hose is arranged to receive the fitting on the end of the hose remote from the packing gland, the assembled mandrel with its coiled spring extending into the opening 17 of the fixture 16. After the parts have been thus assembled, the valve 19 is opened and fluid under extremely high pressure is admitted to the hollow portion of the fixture 17 and to the interior of the closed section, its escape being blocked by the packing gland 14 which surrounds the end of the portion 11 of the mandrel. The fluid thus applied through the valve 19 expands the hose 20 and at the same time assists in forcing the mandrel and its surrounding coil of spring wire into the hose to a position at which the end of the spring wire enters the recess 21 in the end of the thimble of the coupling 15. If the pressure produced by the fluid entering through 19 is insufficient to slide the portion 11 of the mandrel through the packing gland, it may be assisted by the application of a pulling force on the protruding end of the mandrel. When the mandrel and spring have arrived at the position at which the spring abuts the recess 21, the portion 11 of the mandrel is pulled on for a sufficient distance to cause the portions 10 and 11 of the mandrel to spread out their driver and slot connection. This frees the part 10 of the mandrel which then rotates rapidly under the influence of the spring and permits the spring to become expanded within the bore of the hose, which itself is now expanded under the influence of the pressure from the valve 19. The valve 19 is now closed and the portion 11 pulled outwardly a sufficient distance to relieve the pressure within the hose, whereupon the hose contracts firmly about the expanded spring wire coil. The packing gland 14 is now removed from the coupling member 15 and the opposite coupling member is removed from the fixture 16, whereupon the members 10 and 11 may be oppositely removed from the hose section.

A hose made by the process just described exhibits very nearly uniform non-expansive characteristics up to extremely high pressures, since the inner coil or wire has been expanded by its own unfurling action against the wall of the passage through the hose at a time when the hose is expanded to the most extreme size to which it is capable of being safely expanded by the fluid pressure therein delivered from the fixture 16. When the hose is in use, it will withstand an extremely high pressure before the rubber constituting the inner lining of the hose is pressed away from the outer wall of the spring, and even when such pressure is applied as is capable of pressing the hose away from the outer wall of the spring. The second coil of wire embedded between the fabrics of the hose brings a further expansion until substantially the break-down pressure of the hose has been reached. A hose constructed as shown in Fig. 1, and not provided with the inner coil spring, is necessarily somewhat expensive because of the price of the rubber which lines the passage through the hose, but when provided with an expanded spring lining by the process described herein, the expansion under all pressures less than the break-down pressure of the hose becomes substantially negligible.

Although I have illustrated and described one method of inserting a coiled spring lining within the hose, it is to be understood that other methods may be employed without departing from the spirit or scope of my invention.

I claim:—

1. The process of making a substantially non-expanding hose which consists in tightly coiling a spring wire about a mandrel, applying pressure within the hose to expand the same, inserting the mandrel and coil spring wire within the hose while the latter is thus expanded, permitting the spring wire to unfurl within the hose while the latter is still expanded and relieving the pressure within the hose to permit the latter to contract about the unfurled spring wire lining.

2. The process of constructing a substantially non-expanding hose which comprises winding a spring to less than its natural diameter about a mandrel, inserting the mandrel and spring within an opening of the hose, permitting the spring to unfurl within the hose and removing the mandrel.

3. The process of constructing a substantially non-expanding hose which consists in winding a spring about a two-piece mandrel so that the diameter of the spring is contracted to less than its natural diameter, inserting the mandrel and spring within a hose and removing the two parts of the mandrel, one from one end of the hose and the other from the other end of the hose.

4. The process of constructing a substantially non-expanding hose which consists in winding a tightly coiled spring about a two-piece mandrel, inserting a portion of the mandrel which protrudes from the end of the spring entirely through the hose into which the spring is to be inserted, providing a packing joint for the mandrel where it projects from the end of the hose, applying fluid pressure to the other end of the hose for expanding the same to the greatest degree within the safety limit, forcing the mandrel with its spring into the hose, separating the two parts of the mandrel and permitting the spring to unfurl within the hose while the hose is under higher pressure, relieving the pressure within the hose and permitting the hose to contract about the expanded wire coil and removing the mandrel from the hose.

5. The method of making a substantially non-expanding hose which consists in tightly coiling a spring wire, applying pressure within the hose to expand the same, inserting the coil of spring wire within the hose while the latter is thus expanded, permitting the spring wire to unfurl within the hose while the latter is still expanded, and relieving the pressure within the hose to permit the latter to contract about the unfurled spring wire lining.

6. The process of constructing a substantially non-expanding hose which comprises winding a spring less than its natural diameter, inserting the spring within the hose, and permitting the spring to unfurl within the hose.

In witness whereof, I hereunto subscribe my name this 3rd day of July, 1925.

MALCOLM LOUGHEAD.